Nov. 19, 1940.   J. R. ALLEN ET AL   2,221,961
BOLT LOCKING MEANS
Filed July 23, 1938

INVENTOR.
JAMES R. ALLEN
MEARL J. CHAPMAN
BY
ATTORNEY

Patented Nov. 19, 1940

2,221,961

UNITED STATES PATENT OFFICE 2,221,961

BOLT LOCKING MEANS

James R. Allen, Los Angeles, and Mearl J. Chapman, Santa Monica, Calif.

Application July 23, 1938, Serial No. 220,930

2 Claims. (Cl. 151—21)

Our invention relates to bolt locking means.

One of the principal objects of this invention is to provide a nut which is self-locking in any position on the screw element upon which it is threaded without mutilating the latter, so that the nut will not become loosened by vibration and shaking; and which, on the other hand, shall offer no undue resistance to loosening when desired, and which requires, for its manipulation, no tool other than an ordinary wrench.

An important object also of this invention is to provide a locking means of this class which may be readily applied or embodied in or in connection with threaded holes in large objects receiving the screw or both elements.

Another important object of this invention is to provide a lock nut or locking means of this class which is very simple and economical to make or apply.

A further important object is to provide a lock nut or locking means of this class in which the thickness of the threaded portion of the nut or other holding member is not reduced or sacrificed in order to provide the locking means, thus retaining the full holding strength of the nut or other member.

Still another object of this invention is to provide a lock nut or locking means of this class in which the nut, bolt, or screw may be removed or separated many times without destroying the effectiveness of the lock nut or locking means.

A still further object of this invention is to provide a novel, simple and economical method of manufacturing lock nuts of this class.

With these and other objects in view as will appear hereinafter, we have devised a novel lock nut or locking means having certain novel features of construction, combination, and arrangement of parts and portions, and a certain novel method of manufacture, as will be hereinafter described in detail and particularly set forth in the appended claims, reference being had to the accompanying drawing and to the characters of reference thereon, which form a part of this application, in which:

Figure 2:
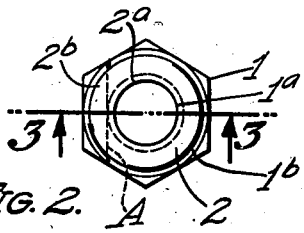
Fig. 2 is an outer end view thereof.
Figure 1:
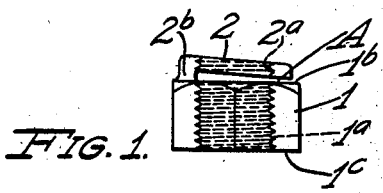
Fig. 1 is a side elevation of a nut embodying our invention in a preferred form.
Figure 3:
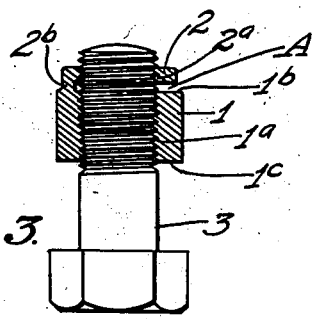
Fig. 3 is a side view of a bolt having screwed thereon a nut incorporating our invention and shown in section, the section being taken at 3—3 of Fig. 2.

The main body portion 1 of the lock nut body, shown in Figs. 1, 2, and 3, is similar in appearance and construction to the conventional nut, having a threaded hole 1ª. At the outer face is a relatively stiff but resilient leaf 2, in the form of a washer, which also has a short threaded hole 2ª. This leaf may be of the same diameter as the main body portion of the nut, or distance across the flat sides of the latter. It is integrally secured at one edge 2ᵇ to the face 1ᵇ of the main body portion. The main body portion 1 of the nut is of the conventional height or thickness, while the overall dimension is greater than such normal or conventional height or thickness. Near the outer face of the body portion is a transverse slot A which extends from one side of the nut toward the opposite side and terminates immediately or substantially beyond the thread at said opposite side. The threads of the hole 2ª are preferably a continuation of the threads of the hole 1ª when the leaf or washer is parallel to the face 1ᵇ. However, the free end of the leaf is normally inclined or bent toward such face until the nut is screwed on the threaded shank of a bolt.

When a bolt or screw 3 is inserted and screwed into the nut from the bottom face of the nut beyond the outer face and into the threaded hole of the leaf or washer portion, as shown in Fig. 3, such leaf or washer portion assumes a position parallel to the face of the main nut portion. When in this position, the nut carries the same, or slightly more than, the load of the ordinary nut. The leaf, when initially distorted as stated, exerts a considerable spring engagement against the threads of the bolt or screw, resulting in a constantly tight engagement and retention of the nut on the bolt, and reducing to a minimum the possibility of loosening or removal of the nut from the bolt from vibration or the like.

Figure 4:
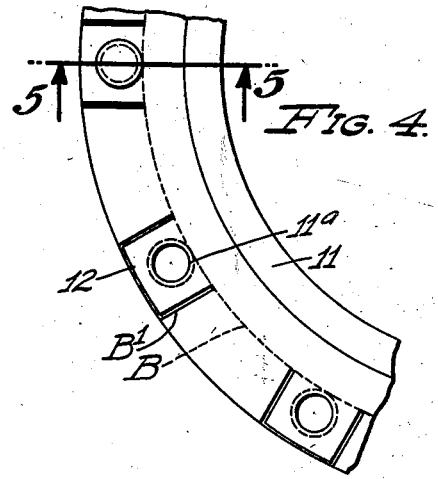
Fig. 4 is a fragmentary plan of a flange having threaded holes and incorporating our invention in connection with the holes.
Figure 5:
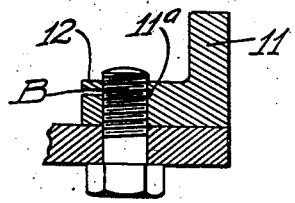
Fig. 5 is a fragmentary section taken through 5—5 of Fig. 4.

In Figs. 4 and 5 we have shown the foregoing principle embodied in a flange member for securing the latter to another member. In this instance the edge of the flange member 11 is provided with a circumferential slot B near the outer side, and through all of the tapped holes 11ª. The arcuate leaf 12, thus formed, is pressed inwardly, partly closing the slot. This leaf provides the same locking means as above set forth.

Figure 6:
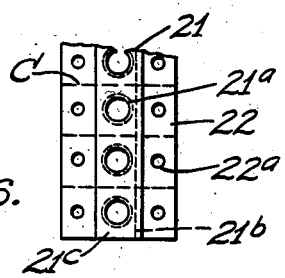
Fig. 6 is a fragmentary plan of a strip for making nuts, illustrating a method of manufacture.
Figure 7:
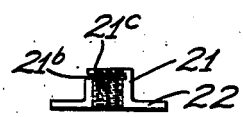
Fig. 7 is an end view thereof.

In Figs. 6 and 7, we have illustrated a method of making nuts. This method consists of forming long strips 21 of the width of the desired nut, and also the thickness of the desired nut. At each side of this strip we have shown laterally extending flanges 22 flush with the bottom face of the strip. The main or thick portion of the strip is provided with uniformly spaced tapped holes 21ª. At one side of the strip is a transverse slot 21ᵇ which extends the full length of the strip and forms a thin but relatively stiff and resilient leaf 21ᶜ, as and for the purposes set forth above. The flanges 22 are provided with anchor or screw holes 22ª in the same plane with each of the tapped holes. The strip is then cut or divided transversely along the dotted lines C to form separate nuts, each having anchor flanges at the opposite sides.

The strip shown in Figs. 6 and 7 may be forged or die cast; but we have found that they may be economically made by extruding the metal, in the cross-section shown, from the molten or plastic state. After formation of the strips, the holes are made, the slots cut where necessary, and the nuts are then separated as stated.

Though we have shown and described a particular construction of the nuts or locking means, and a particular method of manufacturing the same, we do not wish to be limited thereto, but desire to include in the scope of our invention, the construction, combination, arrangement, and method substantially as set forth in the appended claims.

We claim:

1. A screw locking means comprising a continuous flange member having a plurality of tapped holes transversely therethrough, and slot means transversely of the holes and adjacent the face of the member located at one end of the holes, the slot means extending from one side of the member to a depth immediately through the tapped hole, said slot means providing, at one side of the slot means, a thin relatively stiff but resilient leaf, and, at the opposite side of the slot means, a main body portion having a normal nut thickness, said resilient leaf having spaced substantially parallel slots at the opposite sides of the tapped holes, said slots extending into said flange member from said first mentioned side of the flange member, the portion of the leaf between the spaced slots being inclined at a slight angle to the adjacent face of the main body portion, the tapped holes in the leaf and the latter portion of the body being in alignment and substantially a continuation when the leaf is parallel to said face.

2. A screw locking means comprising a circular flange member having a plurality of tapped holes transversely therethrough, and slot means transversely of the holes and adjacent the face of the member located at one end of the holes, the slot means extending from one side of the member to a depth immediately through the tapped hole, said slot means providing, at one side of the slot means, a thin relatively stiff but resilient leaf, and, at the opposite side of the slot means, a main body portion having a normal nut thickness, said resilient leaf having spaced substantially radial slots at the opposite sides of the tapped holes, said slots extending into said flange member from said first mentioned side of the flange member, the portion of the leaf between the spaced slots being inclined at a slight angle to the adjacent face of the main body portion, the tapped holes in the leaf and the latter portion of the body being in alignment and substantially a continuation when the leaf is parallel to said face.

JAMES R. ALLEN.
MEARL J. CHAPMAN.